United States Patent
Joshi et al.

(10) Patent No.: US 10,846,541 B2
(45) Date of Patent: Nov. 24, 2020

(54) SYSTEMS AND METHODS FOR CLASSIFYING ROAD FEATURES

(71) Applicant: QUALCOMM Incorporated, San Diego, CA (US)

(72) Inventors: Avdhut Joshi, Carlsbad, CA (US); Arvind Ramanandan, Sunnyvale, CA (US); Murali Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/629,311

(22) Filed: Jun. 21, 2017

(65) Prior Publication Data
US 2018/0189576 A1 Jul. 5, 2018

Related U.S. Application Data

(60) Provisional application No. 62/442,415, filed on Jan. 4, 2017.

(51) Int. Cl.
*G01C 21/16* (2006.01)
*G01C 22/00* (2006.01)
(Continued)

(52) U.S. Cl.
CPC .......... *G06K 9/00798* (2013.01); *G01B 11/30* (2013.01); *G01C 21/165* (2013.01);
(Continued)

(58) Field of Classification Search
CPC ........ G01C 21/00; G01C 21/04; G01C 21/06; G01C 21/10; G01C 21/12
(Continued)

(56) References Cited

U.S. PATENT DOCUMENTS

2010/0165102 A1* 7/2010 Klebanov .............. B60Q 1/115
                                                        348/135
2010/0201814 A1* 8/2010 Zhang .................. G06K 9/4647
                                                        348/148
(Continued)

FOREIGN PATENT DOCUMENTS

DE     102015104065 A1   9/2016
WO       2015013418 A2   1/2015

OTHER PUBLICATIONS

Hamme D.V., et al., "Robust Monocular Visual Odometry for Road Vehicles Using Uncertain Perspective Projection", EURASIP Journal on Image and Video Processing, vol. 2015, No. 1, Apr. 26, 2015, XP055439050, DOI: 10.1186/s13640-015-0065-6, 21 pages.
(Continued)

*Primary Examiner* — Dwayne D Bost
*Assistant Examiner* — Stephen M Brinich
(74) *Attorney, Agent, or Firm* — Austin Rapp

(57) ABSTRACT

An electronic device is described. The electronic device includes a memory and a processor in communication with the memory. The memory is configured to store precalibration data for a camera mounted on a vehicle, the precalibration data including a camera height determined relative to a road plane the vehicle is configured to contact during operation. The processor is configured to receive a plurality of images. The processor is also configured to classify one or more features in the plurality of images as road features based on the precalibration data.

29 Claims, 8 Drawing Sheets

(51) Int. Cl.
*G06K 9/00* (2006.01)
*G01B 11/30* (2006.01)
*G06K 9/62* (2006.01)

(52) U.S. Cl.
CPC ............ *G01C 22/00* (2013.01); *G06K 9/6267* (2013.01); *G06T 2207/30244* (2013.01)

(58) Field of Classification Search
USPC ........ 382/100, 103–104, 106–107, 155–157, 382/181, 189–190, 192, 276, 312
See application file for complete search history.

(56) References Cited

U.S. PATENT DOCUMENTS

| | | | | |
|---|---|---|---|---|
| 2012/0022739 | A1* | 1/2012 | Zeng | B60W 30/12 701/536 |
| 2013/0120575 | A1* | 5/2013 | Byun | H04N 7/18 348/148 |
| 2014/0316698 | A1 | 10/2014 | Roumeliotis et al. | |
| 2015/0127239 | A1* | 5/2015 | Breed | B60R 21/0132 701/70 |
| 2015/0201180 | A1 | 7/2015 | Mourikis et al. | |
| 2015/0228077 | A1 | 8/2015 | Menashe et al. | |
| 2016/0327395 | A1 | 11/2016 | Roumeliotis et al. | |
| 2017/0168488 | A1* | 6/2017 | Wierzynski | G05D 1/0253 |

OTHER PUBLICATIONS

Hermans F.J.J., et al., "Road Prediction for Intelligent Vehicles Using Video", Apr. 23, 1998, pp. 1/1-1/4, XP006504402.
International Search Report and Written Opinion—PCT/US2017/058212—ISA/EPO—dated Jan. 18, 2018.
Kitt B.M., et al., "Monocular Visual Odometry using a Planar Road Model to Solve Scale Ambiguity", Proceedings of European Conference on Mobile Robots, Sep. 1, 2011, XP055167463, Retrieved from the Internet: URL:http://repository.cmu.edu/robotics/941 [retrieved on Feb. 5, 2015], 8 pages.
Miksch M., et al., "Automatic Extrinsic Camera Self-Calibration Based on Homography and Epipolar Geometry", Intelligent Vehicles Symposium (IV), 2010, IEEE, Piscataway, NJ, USA, Jun. 21, 2010, pp. 832-839, XP031732209, ISBN: 978-1-4244-7866-8.
Sotelo M.A., et al., "Ego-Motion Computing for Vehicle Velocity Estimation", Feb. 12, 2007, Computer Aided Systems Theory—EUROCAST 2007; [Lecture Notes in Computer Science], Springer Berlin Heidelberg, Berlin, Heidelberg, pp. 1119-1125, XP019081965, ISBN: 978-3-540-75866-2.
Zhou D., et al., "Reliable Scale Estimation and Correction for Monocular Visual Odometry", 2016 IEEE Intelligent Vehicles Symposium, Jun. 19, 2016, pp. 490-495, XP032939009, DOI: 10.1109/IVS.2016.7535431, [retrieved on Aug. 5, 2016].
Hernandez D.C., et al., "Iterative Road Detection based on Vehicle Speed", 2015 8th International Conference on Human System Interaction (HSI), Jun. 25, 2015, pp. 228-233, XP033184786.

* cited by examiner

SYSTEMS AND METHODS FOR CLASSIFYING ROAD FEATURES

RELATED APPLICATIONS

This application is related to and claims priority from U.S. Provisional Patent Application Ser. No. 62/442,415, filed Jan. 4, 2017, for "SYSTEMS AND METHODS FOR CLASSIFYING ROAD FEATURES."

TECHNICAL FIELD

The present disclosure relates generally to electronic devices. More specifically, the present disclosure relates to systems and methods for classifying road features.

BACKGROUND

Electronic devices (e.g., cellular telephones, wireless modems, computers, digital music players, Global Positioning System units, Personal Digital Assistants, gaming devices, etc.) have become a part of everyday life. Small computing devices are now placed in everything from vehicles to housing locks. The complexity of electronic devices has increased dramatically in the last few years. For example, many electronic devices have one or more processors that help control the device, as well as a number of digital circuits to support the processor and other parts of the device.

Some electronic devices (e.g., vehicles) may be equipped with advanced driver assistance systems. These systems may be a first step toward autonomous vehicles. One useful technology in these systems is visual inertial odometry (YID). Systems and methods for classifying road features may be beneficial in assisting with visual inertial odometry.

SUMMARY

An electronic device is described. The electronic device includes a memory storing precalibration data for a camera mounted on a vehicle, the precalibration data including a camera height determined relative to a road plane the vehicle is configured to contact during operation. The electronic device also includes a processor in communication with the memory. The processor is configured receive a plurality of images. The processor is also configured to classify one or more features in the plurality of images as road features based on the precalibration data.

The camera height may include a perpendicular distance between an optical axis of the camera and the road plane. The precalibration data may also include a pitch of the camera about a first dimension that is orthogonal to the optical axis of the camera. The precalibration data may further include a roll of the camera about the optical axis of the camera.

Classifying the one or more features in the plurality of images as road features includes determining features that lie below a horizon based on the pitch of the camera. An inverse projection of the features that lie below the horizon may be performed using a relative transform between the optical axis of the camera and the road plane based on the precalibration data. A feature may be classified as a road feature if the feature is located within a predefined range in the road plane.

The predefined range may include a lateral range and a depth range with respect to the road plane. The depth range may be oriented along the optical axis of the camera as transformed to the road plane. The lateral range may be oriented along the first dimension that is orthogonal to the optical axis of the camera as transformed to the road plane.

Classifying the one or more features in the plurality of images as road features may also include aligning an image patch normal to a road plane normal.

Classifying the one or more features in the plurality of images as road features may also include applying intensity information and location information of a feature to a machine learning model.

The processor may be further configured to compute a depth of the road features using an inverse projection of the features. A feature inverse depth may be updated based on the computed depth. A visual inertial odometry (VIO) extended Kalman filter (EKF) may be updated based on the updated feature inverse depth. The processor may also be configured to update the VIO EKF based on an uncertainty of road model depth standard deviation.

The processor may be further configured to receive a stream of data from an inertial measurement unit. The stream of data may include data from a three-axis accelerometer and data from a three-axis gyroscopic sensor.

A method is also described. The method includes storing precalibration data for a camera mounted on a vehicle, the precalibration data including a camera height determined relative to a road plane the vehicle is configured to contact during operation. The method also includes receiving a plurality of images. The method further includes classifying one or more features in the plurality of images as road features based on the precalibration data.

A non-transitory computer readable medium storing computer executable code is also described. The computer readable medium includes code for causing an electronic device to store precalibration data for a camera mounted on a vehicle, the precalibration data including a camera height determined relative to a road plane the vehicle is configured to contact during operation. The computer readable medium also includes code for causing the electronic device to receive a plurality of images. The computer readable medium further includes code for causing the electronic device to classify one or more features in the plurality of images as road features based on the precalibration data.

An apparatus is also described. The apparatus includes means for storing precalibration data for a camera mounted on a vehicle, the precalibration data including a camera height determined relative to a road plane the vehicle is configured to contact during operation. The apparatus also includes means for receiving a plurality of images. The apparatus further includes means for classifying one or more features in the plurality of images as road features based on the precalibration data.

DETAILED DESCRIPTION

The systems and methods disclosed herein relate to classifying road features. Road features may be features lying (i.e., situated) on a road. For example, the systems and methods disclosed herein may leverage the road structure to aid automotive visual inertial odometry (VIO).

As a vehicle moves with a constant velocity, biases in an inertial measurement unit (IMU) may not be observable, which may result in scale drift. In a monocular VIO, the depth of the vision features may be computed using an estimated VIO trajectory. The vision features may not provide any correction for the scale drift.

In one configuration, road geometry may be used to compute the depth of road features. This may provide an independent measurement for the scale of the trajectory.

In some configurations, extrinsic calibration of the camera and inertial measurement unit (IMU) system may be determined with respect to the road. Roll, pitch and camera height with respect to the ground may be computed.

In an implementation, features may be classified as road features based on geometry. In another implementation, features may be classified as road features based on a machine learning model. To facilitate tracking of these road features, the image patch normal may be aligned to the road plane normal.

In some configurations, during a batch update phase, the depth of a road feature may be recomputed based on a latest camera measurement. The recomputed depth may be used in the measurement update for an extended Kalman filter.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
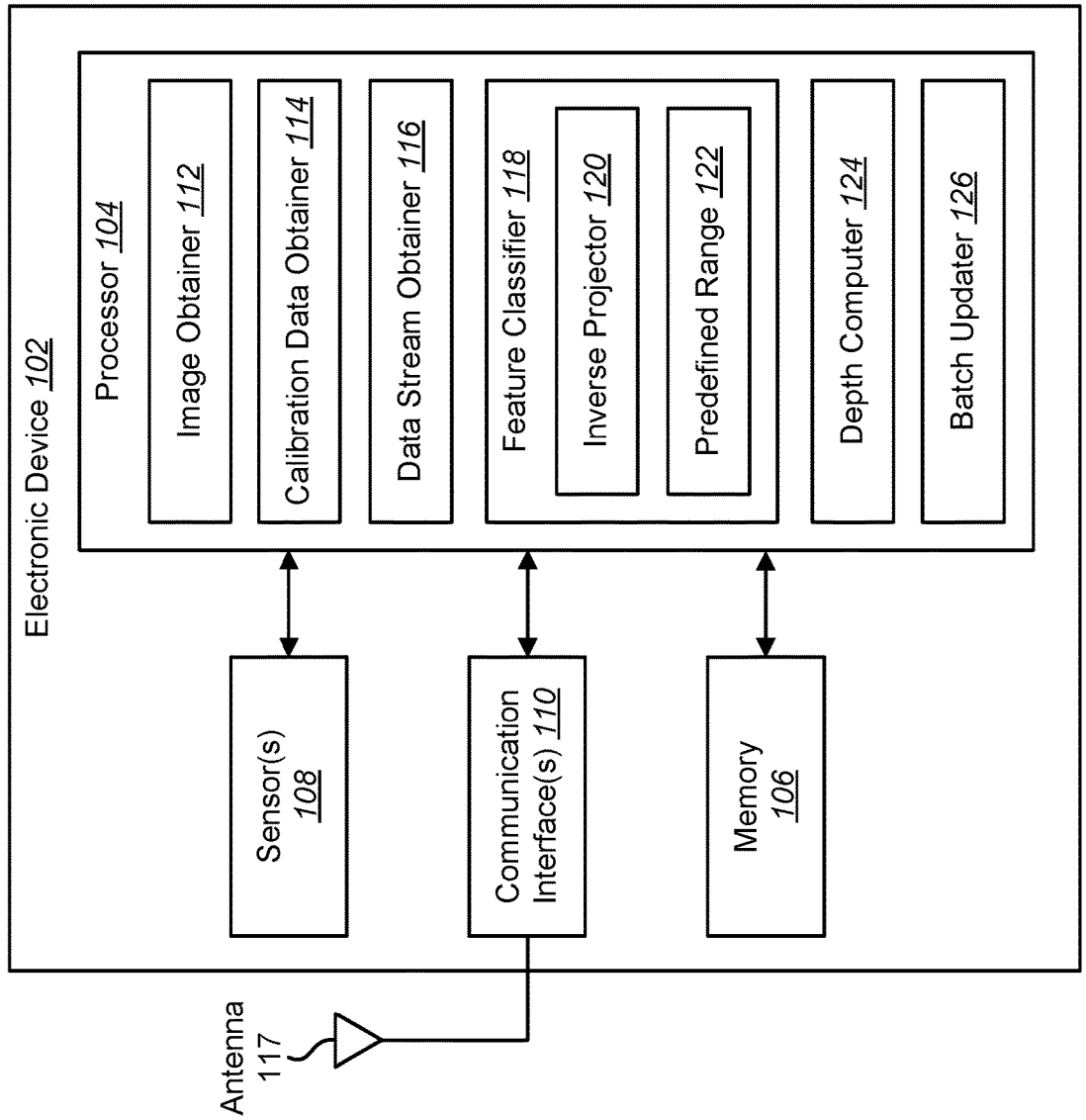
FIG. 1 is a block diagram illustrating one example of an electronic device in which systems and methods for classifying a road feature may be implemented.

FIG. 1 is a block diagram illustrating one example of an electronic device 102 in which systems and methods for classifying a road feature may be implemented. Examples of the electronic device 102 include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, appliances, etc. For instance, the electronic device 102 may be a vehicle used in an Advanced Driver Assistance System (ADAS).

It should be noted that the electronic device 102 may include or may be included in a vehicle. In an implementation, the electronic device 102 may include all of the systems of a vehicle. In another implementation, the electronic device 102 may be a sub-system that is mounted on or configured with a vehicle. In yet another implementation, the electronic device 102 may be separate from (e.g., not physically connected to) a vehicle, but may communicate with the vehicle (e.g., via a data network).

In an implementation, the electronic device 102 may be configured with a visual inertial odometry (VIO) system. The VIO system may be implemented as a positioning engine that combines camera input with inertial information provided by an inertial measurement unit (IMU) system to determine the position of a vehicle. The IMU may include one or more accelerometers and/or one or more gyroscopic sensors with which the IMU generates inertial measurements.

In an approach, the VIO system may integrate inertial measurements to obtain the position of the electronic device 102. However, inertial measurements may not be sufficient to determine the location of the electronic device 102. One problem with inertial measurements in a VIO application is scale drift. As a vehicle moves with a constant velocity, biases in an inertial measurement unit (IMU) may not be observable, which may result in scale drift. As used herein, "bias" (also referred to as sensor bias) is the difference between an ideal output and the actual output provided by a sensor 108 (e.g., gyroscopic sensor or accelerometer).

In a monocular VIO (e.g., using a monocular camera to provide image information), the depth of the vision features may be computed using an estimated VIO trajectory. The vision features may not provide any correction for the scale drift.

In an example, when a vehicle (e.g., the electronic device 102) moves at a constant velocity, especially in a highway scenario, the accelerometer that measures the acceleration becomes zero. In this case, there is no observable signal for biases in the system (i.e., the accelerometer bias) which becomes a scalar value. Therefore, in a monocular camera system, for all the features that are observed, the VIO system can only measure the location of the features up to a scale. For example, if a monocular camera were to look at the same feature point from three different camera vantage points, the position of the feature could be triangulated in the real world, but the position would only be up to a scale. The position of the feature point can arbitrarily move away in a depth sense. Therefore, the precise location of the feature point cannot be observed without additional data.

It should be noted that an advantage of using an inertial sensor is that when there is enough acceleration or excitation in the accelerometer or in the gyroscopic sensor, the scale becomes observable. The problem with vehicular motion is that when the vehicle is going in a very straight line with approximately constant velocity, the scale becomes unobservable using only inertial measurements.

Another problem with inertial measurements in a VIO application is that IMU measurements tend to become noisy at constant velocity. Without the use of visual features to constrain the IMU measurements, the six degrees of freedom of the camera pose is unobservable. In the case of automotive VIO, the camera pose may be the pose of the vehicle itself.

As observed by this discussion, benefits may be obtained by using visual features to assist VIO. The systems and methods described herein use road geometry to compute the depth of road features. The road feature depth provides an independent measurement for the scale of the trajectory of the electronic device 102.

In an automotive context, the electronic device 102 may be a vehicle or may be included in a vehicle. In this case, the vehicle will be driving on a road. If the roll, pitch and height of the camera on the vehicle are calibrated relative to the ground, the scale of road features may be recovered by leveraging the constraint that the camera and IMU system will be moving on a road plane. In other words, if a feature is on the road, the features must be a certain distance away from the camera given the camera parameters (e.g., roll, pitch and height) relative to the road. The electronic device 102 may determine an independent measure of the scale, which provides an additional constraint for the visual inertial odometry.

As used herein the term "road geometry" refers to the position and orientation of the camera relative to the road. The electronic device 102 may take advantage of the position of the camera relative to the road to solve the issue of scale drift when inertial sensors are insufficient.

The electronic device 102 may include one or more components or elements. One or more of the components or elements may be implemented in hardware (e.g., circuitry) or a combination of hardware and software and/or firmware (e.g., a processor 104 with instructions).

In some configurations, the electronic device 102 may include a processor 104, a memory 106, one or more sensors 108, and/or one or more communication interfaces 110. The processor 104 may be coupled to (e.g., in electronic communication with) the memory 106, sensor(s) 108, and/or communication interface(s) 110.

The processor 104 may be a general-purpose single- or multi-chip microprocessor (e.g., an ARM), a special-purpose microprocessor (e.g., a digital signal processor (DSP)), a microcontroller, a programmable gate array, etc. The processor 104 may be referred to as a central processing unit (CPU). Although just a single processor 104 is shown in the electronic device 102, in an alternative configuration, a combination of processors 104 (e.g., an image signal processor (ISP) and an application processor, an ARM and a DSP, etc.) could be used. The processor 104 may be configured to implement one or more of the methods disclosed herein. For example, the processor 104 may be configured to classify one or more road features.

In some configurations, the electronic device 102 may perform one or more of the functions, procedures, methods, steps, etc., described in connection with one or more of FIGS. 2-8. Additionally or alternatively, the electronic device 102 may include one or more of the structures described in connection with one or more of FIGS. 2-8.

The communication interface(s) 110 may enable the electronic device 102 to communicate with one or more other electronic devices 102. For example, the communication interface(s) 110 may provide an interface for wired and/or wireless communications. In some configurations, the communication interface(s) 110 may be coupled to one or more antennas 117 for transmitting and/or receiving radio frequency (RF) signals. Additionally or alternatively, the communication interface(s) 110 may enable one or more kinds of wireline (e.g., Universal Serial Bus (USB), Ethernet, etc.) communication.

In some configurations, multiple communication interfaces 110 may be implemented and/or utilized. For example, one communication interface 110 may be a cellular (e.g., 3G, Long Term Evolution (LTE), Code Division Multiple Access (CDMA), etc.) communication interface 110, another communication interface 110 may be an Ethernet interface, another communication interface 110 may be a universal serial bus (USB) interface, and yet another communication interface 110 may be a wireless local area network (WLAN) interface (e.g., Institute of Electrical and Electronics Engineers (IEEE) 802.11 interface). In some configurations, the communication interface 110 may send information (e.g., image information, surround view information, etc.) to and/or receive information from another electronic device 102 (e.g., a vehicle, a smart phone, a camera, a display, a remote server, etc.).

The electronic device 102 may obtain one or more images (e.g., digital images, image frames, video, etc.) and other sensor data. For example, the electronic device 102 may include sensor(s) 108 such as one or more cameras, a global navigation satellite system receiver and an inertia sensor (also referred to as an inertial measurement unit (IMU)). Additionally or alternatively, the electronic device 102 may request and/or receive the one or more images from another device (e.g., one or more external cameras coupled to the electronic device 102, a network server, traffic camera(s), drop camera(s), vehicle camera(s), web camera(s), etc.).

The processor 104 may include and/or implement an image obtainer 112. One or more of the image frames may be provided to the image obtainer 112. In some configurations, the image obtainer 112 may operate in accordance with one or more of the approaches, functions, procedures, steps and/or structures described in connection with one or more of FIGS. 1-8. The image obtainer 112 may obtain images from one or more cameras (e.g., normal cameras, wide-angle cameras, fisheye cameras, etc.). For example, the image obtainer 112 may receive image data from one or more sensors 108 and/or from one or more external cameras. The images may be captured from multiple cameras (at different locations, for example). As described above, the image(s) may be captured from the sensor(s) 108 included in the electronic device 102 or may be captured from one or more remote camera(s).

In some configurations, the image obtainer 112 may request and/or receive one or more images. For example, the image obtainer 112 may request and/or receive one or more images from a remote device (e.g., external camera(s), remote server, remote electronic device, etc.) via the communication interface(s) 110.

The processor 104 may include and/or implement a calibration data obtainer 114, a data stream obtainer 116, a feature classifier 118, a depth computer 124, and a batch updater 126. The feature classifier 118 may include and/or implement an inverse projector 120 and a predefined range 122.

The calibration data obtainer 114 may obtain precalibration data. In an implementation, the precalibration data may include the camera height determined relative to a road plane the vehicle is configured to contact during operation. As used herein, the road plane may be referred to as a ground plane or ground. In an example, contact points of the tires with minimums along a y-axis (e.g., vertical axis) may define the road plane.

The camera height may be the perpendicular distance between the optical axis of the camera and the road plane. In an implementation, the camera height may be preconfigured. In another implementation, the camera height may be calibrated using target markers with known heights from the ground. The camera height may be stored in the memory 106. An example showing how camera height may be defined with respect to the optical axis of the camera and a road plane is described in connection with FIG. 7.

The calibration data obtainer 114 may also obtain the camera pitch and roll. In an implementation, the camera pitch and roll may be preconfigured. For example, the angles of the camera relative to the ground may be stored by the electronic device 102. In another configuration, the camera pitch and roll may be estimated using target markers with known heights from the ground and/or gravity measurements from previous VIO runs. The camera pitch and roll may be stored in the memory 106. An example showing how pitch and roll may be defined with respect to the optical axis of the camera is described in connection with FIG. 7.

The data stream obtainer 116 may receive a stream of data from an inertial measurement unit (IMU). In one configuration, the stream of data may include data from one or more of a three-axis accelerometer and a three-axis gyroscopic sensor. Therefore, the stream of data may include inertial measurements (e.g., acceleration and/or rotation) of the electronic device 102. In an implementation, the calibration data obtainer 114 may determine the camera pitch and roll based on the IMU measurements.

The processor 104 may detect one or more feature points from the camera images. For example, the processor 104 may identify points in the camera images that have strong corners, which are good for tracking. These points may be referred to as keypoints, features or feature points.

In an implementation, the processor 104 may determine a depth for the features using a one-dimensional (1D) extended Kalman filter (EKF) or Gauss-Newton (GN)-based depth estimation method. As used herein, the term "depth" refers to the distance of a point from the camera. It should be noted that the depth obtained by the 1D EKF or GN estimation methods may suffer from scale drift, as described above.

The electronic device 102 may exploit road structure to aid automotive visual inertial odometry (YID). The feature classifier 118 may classify the one or more features in the plurality of images as road features. In other words, the feature classifier 118 may classify features in the plurality of images as lying (i.e., being situated) on the road or not lying on the road. In one configuration, feature classification may be performed during keypoint detection.

In an implementation, the feature classifier 118 may compute a relative transform between the camera and the road plane based on camera height, pitch and roll. The feature classifier 118 may include and/or implement an inverse projector 120. The inverse projector 120 may perform an inverse projection of features that lie below a horizon using the relative transform based on the camera calibration data. The horizon may be computed from the camera pitch that was obtained by the calibration data obtainer 114. For example, using the known angle of the camera pitch, a line in the images representing the horizon may be defined. Features that are located below this line in the image may be considered as lying below the horizon.

If the features lie below the horizon, then the inverse projector 120 may inverse project the features back onto a road coordinate system. Therefore, based on the road geometry, if a feature is below the horizon, the inverse projector 120 may inverse project that feature back onto a 3D location, given that the point may lie on the road plane.

In one configuration, the inverse projection may provide a three-dimensional (3D) location of the feature in a road coordinate system. A transform between road and camera coordinate systems may use the following equation.

$$X_c = R_{cr} X_r + T_{cr} \quad (1)$$

In Equation (1), $X_c$ represents the 3D location of a feature point in the camera coordinate system. $R_{cr}$ represents a rotation matrix between the camera coordinate system and the road coordinate system and may be determined from the precalibrated pitch and roll of the camera. $X_r$ represents the 3D location of the feature point in the road coordinate system. $T_{cr}$ represents a translation between the camera coordinate system and the road coordinate system and is known based on the extrinsic calibration data. In one configuration, $T_{cr}$ may equal [0 0 0]'.

In one configuration, the perspective projection may use the following Equation (2).

$$x_c = K(R_{cr} X_r + T_{cr}) \quad (2)$$

In Equation (2), $x_c = [u\ v\ w]$ and $x_c$ is a pixel location of the feature with u v w as components of the pixel, and K is a camera matrix.

In one configuration, the plane equation (Π) for the road may be expressed according to Equation (3).

$$\Pi: aX + bY + cZ + d = 0 \quad (3)$$

In some configurations, a=0, b=1, c=0, and d=the camera height. The plane equation (Π) may define a flat road plane.

A planar constraint may be added into the perspective equation (2) as follows.

$$\begin{bmatrix} x_c \\ 0 \end{bmatrix} = \begin{bmatrix} KR_{cr} & 0 \\ a\quad b\quad c & d \end{bmatrix} \begin{bmatrix} X_r \\ 1 \end{bmatrix} + \begin{bmatrix} KT_{cr} \\ 0 \end{bmatrix} \quad (4)$$

In one configuration, road coordinates and depth may be solved using the following equation.

$$\begin{bmatrix} X_r \\ w \end{bmatrix} = \begin{bmatrix} & & -x \\ KR_{cr} & & -y \\ & & -1 \\ a\quad b\quad c & 0 \end{bmatrix} \begin{bmatrix} -KT_{cr} \\ -d \end{bmatrix} \quad (5)$$

In Equation (5), x and y are undistorted pixel coordinates. The depth (z) is a component of $X_r$. The road coordinate system may be oriented, facing forward with respect to the camera, with the following components: x-right, y-down, z-forward. Additional details of the translation from the camera plane (e.g., camera coordinate system) to the road plane (e.g., road coordinate system) is described in connection with FIG. 7.

The feature classifier 118 may classify a feature as a road feature if the feature is within a predefined range 122. In an implementation, the predefined range 122 may include one or more distance ranges. The distance of a feature may be determined based on coordinates of the feature as transformed in the road coordinate system. The predefined range 122 may include a lateral range (e.g., left/right) and a depth range (e.g., forward). In an implementation, the limits of the lateral range may be defined by a negative x-coordinate (e.g., −xRange) and a positive x-coordinate (e.g., xRange). The limits of the depth range may be defined by zero (e.g., a point corresponding to the location of camera lens) and a positive z-coordinate (e.g., zRange).

In one configuration, the feature may be classified as a road feature if the feature is within an x-coordinate range [−xRange, xRange] and a z-coordinate range [0, zRange] within the road coordinate system. The x-coordinate range may correspond to a lateral (e.g., left/right) position of a feature within the road plane. The z-coordinate range may correspond to a depth position of a feature within the road plane.

In another implementation, the feature classifier 118 may classify features in the camera images as a road feature based on a machine learning model. For example, the electronic device 102 may be configured with a machine learning model configured to classify features in an image based on intensity, color and location of the feature. This machine learning approach may be implemented using one or more machine learning methods (e.g., supervised learning, artificial neural network, decision tree, etc.). In an example, the machine learning model may be generated using a one or more training sets that associate intensity/color and location information with known road features.

The feature classifier 118 may apply intensity/color information and location information of a given feature in the image to the machine learning model. The machine learning model may indicate whether the given feature is a road feature or not.

The processor 104 may include and/or implement a depth computer 124. In one configuration, the depth computer 124 may compute a depth of a road feature using the inverse projection of the feature. For example, the depth computer 124 may solve for depth (z) for a given road feature using Equations 1-5. In other words, if a feature is classified as a road feature, the depth computer 124 may compute the depth of the feature points using a road model (e.g., a flat plane assumption) with the extrinsic calibration parameters (e.g., camera height, roll and pitch). For features that are not classified as road features, the processor 104 may estimate their depth using the one-dimensional (1D) extended Kalman filter (EKF) or Gauss Newton (GN) based depth estimation methods.

In an implementation, the processor 104 may set the tracking of road features when the detection occurs to aid in tracking a road feature between image frames. The patch normal of a road feature may be set to the normal of the road plane. To track a road feature, the processor 104 may use an image patch around that feature. The processor 104 may then try to locate that image patch in the consecutive frames that are received.

To perform tracking, when the camera moves from one location to the next location, the processor 104 looks for the same image patch. The problem with looking for a similar image patch when the vantage point has moved is that the image patch may not look very similar from one frame to another. The image patch may be warped around based on the motion that the camera has taken. To do the warping correctly, the normal of the patch may be determined. If the patch normal is not set correctly, the tracking may suffer. As used herein, the term normal is a perpendicular ray that is coming from a plane (e.g., the image patch plane or the road plane).

The processor 104 may set the patch normal for a given road feature to the normal of the road plane, which is now known based on the calibrated pitch, roll and height of the camera. Using the patch normal, the processor 104 may adjust for the movement that occurs between image frames. This aids the processor 104 in tracking the road feature correctly.

Batch updates may be performed with the depth computed from the model to introduce secondary scale information. Once the depths of the road features are determined using the road model, these depths may be used in a batch update to override the depths estimated using other methods (e.g., GN depth estimation).

Upon classifying the road features, these road features may be used in the VIO system. The VIO system may include or implement an extended Kalman filter (EKF) that is continuously running. In a batch update, for every detected feature, the processor 104 may use the information from the feature to refine the pose and the trajectory of the camera or the vehicle.

As described above, in a general case, the depth of a feature may be computed using the Gauss-Newton based method. However, if a feature is classified as a road feature, the depth of the road feature that is computed from the GN-based method may be discarded. This is because the GN-based method may be corrupted due to the unobservability of the scale. The road model-based road depth that is determined from the inverse projection may be used instead.

In one configuration, the processor 104 may include and/or implement a batch updater 126. The batch updater 126 may update a feature inverse depth based on the recomputed depth. For example, a feature may be initialized with the inverse depth (i.e., z coordinate) from the inverse projection. In another example, the GN depth for a road feature may be discarded and replaced with the recomputed depth determined based on road geometry. The batch updater 126 may update the VIO EKF based on the updated feature inverse depth. In an implementation, during the batch update step, the inverse depth that is computed from the road model may provide a constraint to the EKF as EKF parameters are updated to explain the depth computed from the road model.

In an implementation, the uncertainty of the feature depth may also be used to update the EKF. The uncertainty of the road depth may be computed using the road model depth standard deviation. For example, the batch updater 126 may pass the road model depth standard deviation with the road feature depth to influence the strength of the constraint provided by the road feature model. It should be noted that the road model-based depth determination has a reduced depth uncertainty as compared to a GN depth estimate. Therefore, the road model-based may result in more accurate VIO operation.

The memory 106 may store instructions and/or data. The processor 104 may access (e.g., read from and/or write to) the memory 106. The memory 106 may store the images and instruction codes for performing operations by the processor 104. The memory 106 may be any electronic component capable of storing electronic information. The memory 106 may be embodied as random access memory (RAM), read-only memory (ROM), magnetic disk storage media, optical storage media, flash memory devices in RAM, on-board memory included with the processor 104, erasable programmable read-only memory (EPROM), electrically erasable programmable read-only memory (EEPROM) memory, registers, and so forth, including combinations thereof.

Data and instructions may be stored in the memory 106. The instructions may be executable by the processor 104 to implement one or more of the methods described herein. Executing the instructions may involve the use of the data that is stored in the memory 106. When the processor 104 executes the instructions, various portions of the instructions may be loaded onto the processor 104, and various pieces of data may be loaded onto the processor 104.

It should be noted that one or more of the elements or components of the electronic device 102 may be combined and/or divided. It should be noted that one or more of the elements or components described in connection with FIG. 1 may optional.

Figure 2:
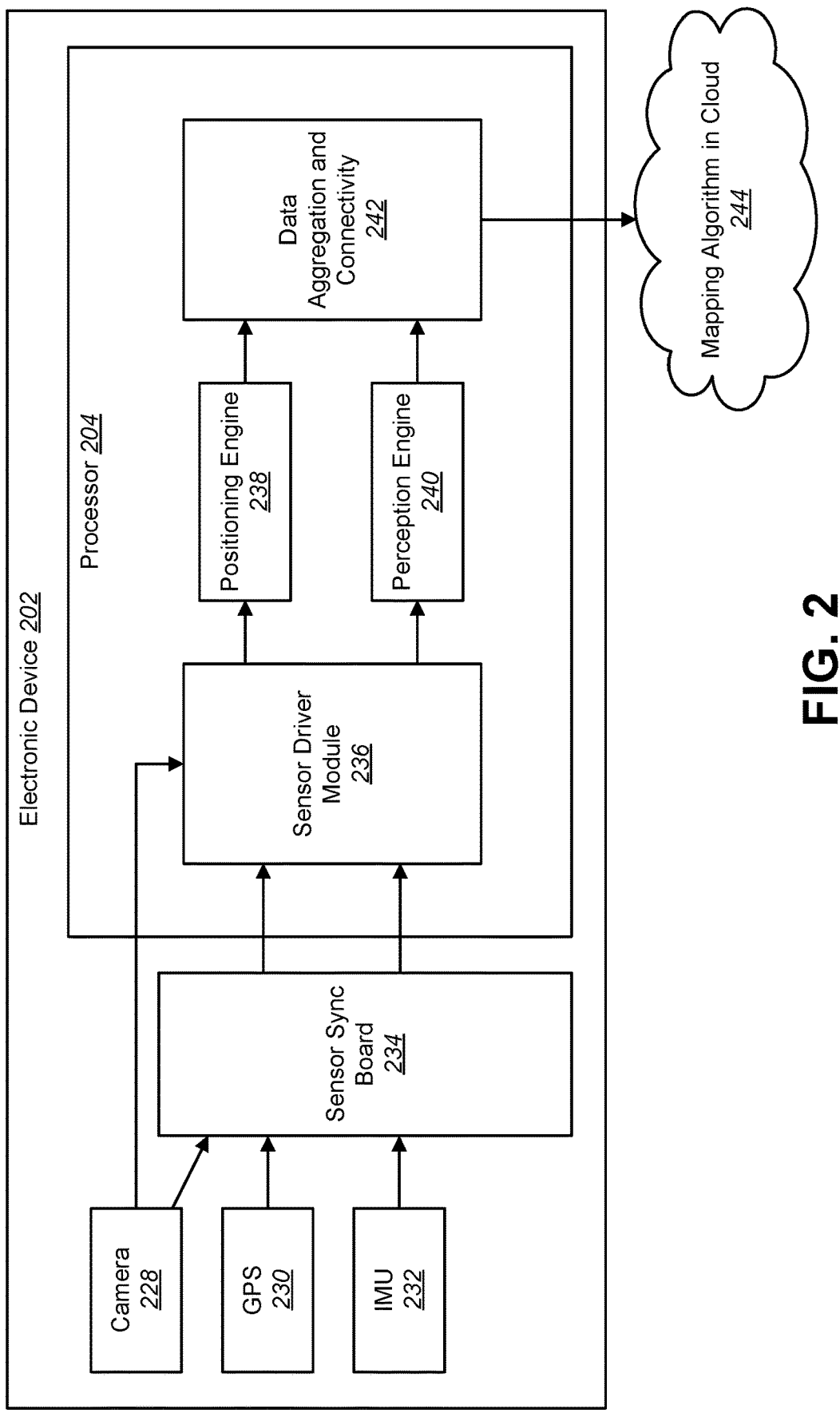
FIG. 2 is a block diagram illustrating one example of an electronic device in which classification of road features may be implemented.

FIG. 2 is a block diagram illustrating one example of an electronic device 202 in which classification of road features may be implemented. The electronic device 202 may describe a precise positioning and mapping platform (PPMP). The PPMP may provide precise positioning and mapping capability with a set of economically viable sensors, edge processing and analytic capabilities. Mapping algorithms 244 in the cloud may be detected and will localize key landmarks to generate precise localization maps.

The system may include a camera 228, a global positioning system (GPS) receiver 230, an inertia sensor (IMU) 232, a sensor synchronization board 234, and a processor 204. The processor 204 may include a sensor driver module 236, a positioning engine 238, a perception engine 240, and a data aggregation and connectivity module 242.

The processor 204 may communicate with one or more devices over a wireless or wired network. The one or more devices may perform a mapping algorithm 244.

The front-end sensors 108 (e.g., the camera 228, GPS receiver 230, and IMU 232) may be consumer-grade sensors. The sensor synchronization board 234 may include an embedded microcontroller that controls time stamps of all sensors 108. In an implementation, the sensor synchronization board 234 generate time stamps with less than 10 microseconds timing error.

The output of the camera 228, GPS receiver 230, and IMU 232 may be fed into both the positioning engine 238 and the perception engine 240. The perception engine 240 may detect key landmarks in the incoming video stream and localize them accurately in the image frames. The positioning engine 238 may provide accurate estimates of camera poses in six degrees of freedom (6DoF) by tightly fusing the GPS signal, inertial sensor readings, and camera video inputs.

The outputs of the positioning engine 238 and the perception engine 240 may be aggregated and sent to the cloud via the data aggregation and connectivity module 242. The mapping algorithm 244 may generate the location estimate of the landmarks in the global frame.

In one configuration, the systems and methods described herein may be implemented by the positioning engine 238.

Figure 3:
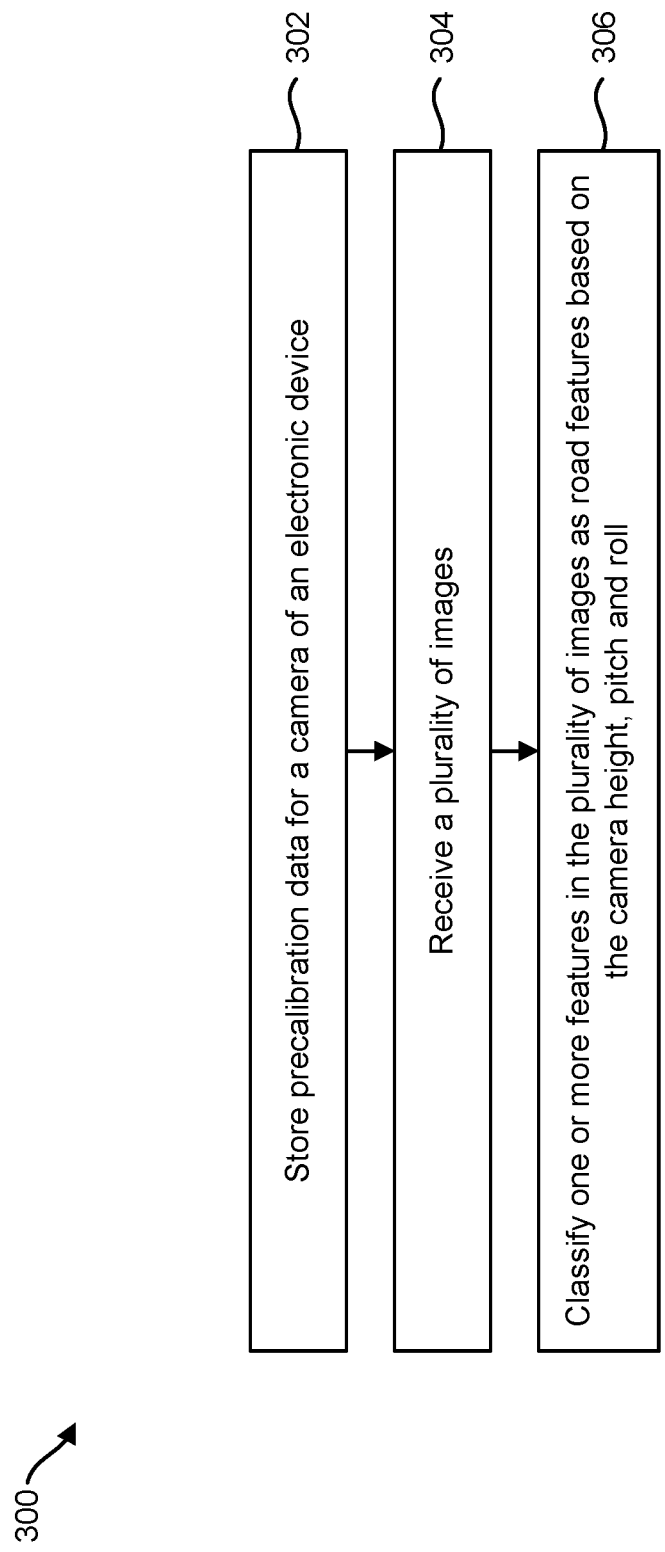
FIG. 3 is a flow diagram illustrating one configuration of a method for classifying road features.

FIG. 3 is a flow diagram illustrating one configuration of a method 300 for classifying road features. The method 300 may be performed by one or more of the electronic devices 102 described herein.

The electronic device 102 may store 302 precalibration data for a camera 228 mounted on a vehicle. The precalibration data may include a camera height determined relative to a road plane the vehicle is configured to contact during operation. The camera height may include a perpendicular distance between an optical axis (e.g., z-coordinate) of the camera 228 and the road plane.

The precalibration data may also include a pitch of the camera 228 about a first dimension (e.g., x-coordinate) that is orthogonal to the optical axis of the camera. The precalibration data may further include a roll of the camera 228 about the optical axis of the camera 228.

In an implementation, the camera height may be preconfigured. In another implementation, the camera height may be determined (e.g., using target markers with known heights from the ground) by the electronic device 102.

In an implementation the camera pitch and roll may be computed in a calibration operation. In an approach, the camera pitch and roll may be estimated using gravity measurements from previous VIO runs. In another approach, the camera pitch and roll may be estimated using target markers with known heights from the ground.

The electronic device 102 may receive 304 a plurality of images. For example, the camera 228 may capture one or more images (e.g., digital images, image frames, video, etc.). The camera 228 may provide the one or more images to the electronic device 102.

The electronic device 102 may classify 306 one or more features in the plurality of images as road features based on the precalibration data. In an implementation, the electronic device 102 may determine features that lie below the horizon based on the pitch of the camera 228. The electronic device 102 may perform an inverse projection of the features that lie below the horizon using a relative transform between the optical axis of the camera 228 and the road plane based on the precalibration data (e.g., the camera height, pitch and roll).

The electronic device 102 may classify 306 a feature as a road feature if the feature located within a predefined range 122 in the road plane. The predefined range 122 may include a lateral range (e.g., an x-coordinate range) and a depth range (e.g., z-coordinate range) with respect to the road plane. The depth range may be oriented along the optical axis of the camera 228 (e.g., z-coordinate) as transformed to the road plane. The lateral range may be oriented along the first dimension (e.g., x-coordinate) that is orthogonal to the optical axis of the camera 228 as transformed to the road plane.

In another implementation, the electronic device 102 may apply intensity information and location information of a feature to a machine learning model. The machine learning model may indicate whether the given feature is a road feature or not.

Figure 4:
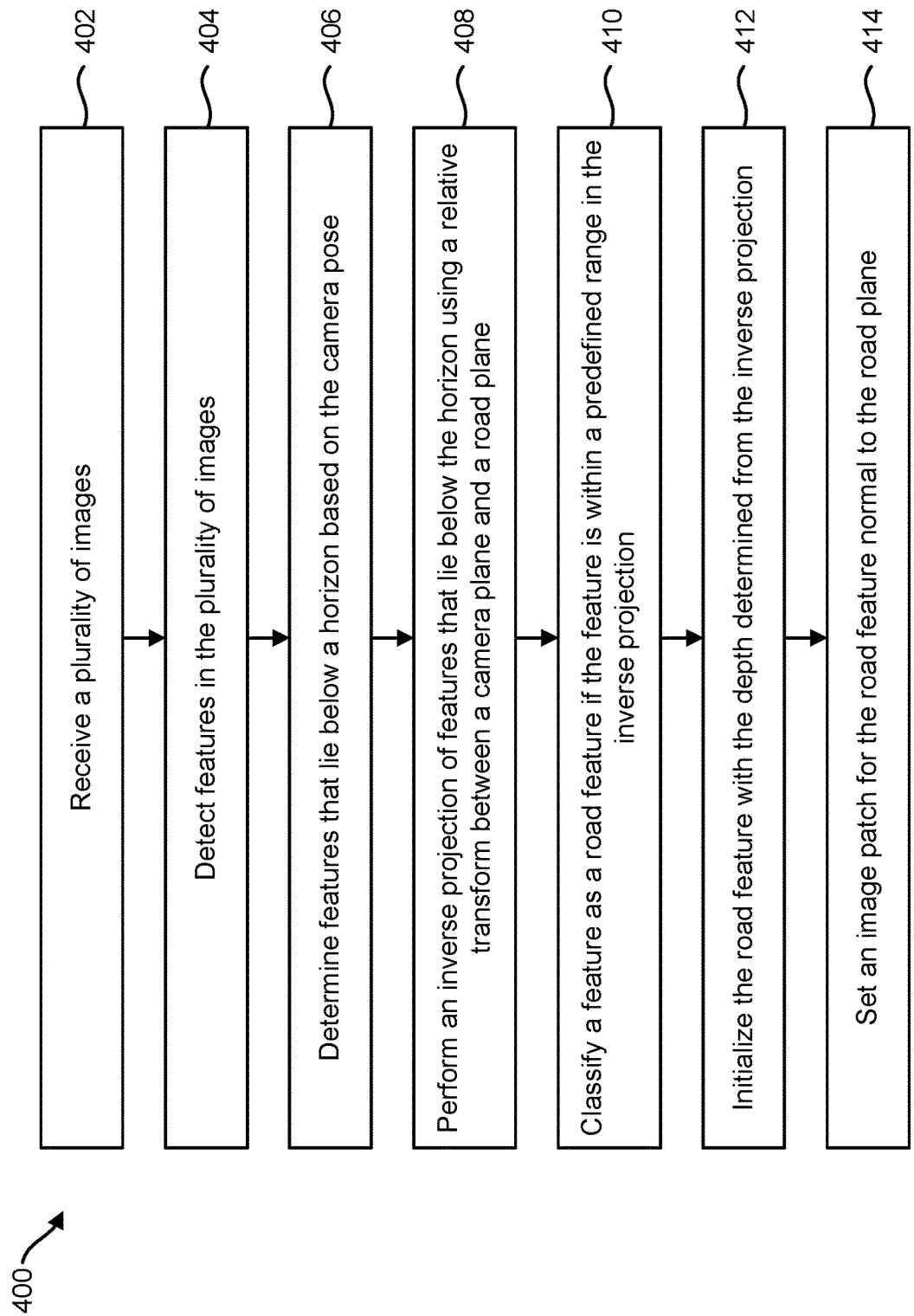
FIG. 4 is a flow diagram illustrating one configuration of a method for classifying road features based on road geometry.

FIG. 4 is a flow diagram illustrating one configuration of a method 400 for classifying road features based on road geometry. The method 400 may be performed by one or more of the electronic devices 102 described herein.

The electronic device 102 may receive 402 a plurality of images. For example, the electronic device 102 may be configured to receive the plurality of images from a camera 228. The camera 228 may capture the one or more images (e.g., digital images, image frames, video, etc.).

The camera 228 may be mounted on a vehicle. In an implementation, the camera 228 may be mounted facing forward on the vehicle.

The electronic device 102 may detect 404 features in the plurality of images. For example, the electronic device 102 may identify features in the camera images that have strong corners. The electronic device 102 may detect 404 the features during a keypoint detection operation.

The electronic device 102 may determine 406 features that lie below a horizon based on the camera pose. For example, the electronic device 102 may use the camera pitch included in precalibration data. The electronic device 102 may determine where the horizon is based on the angle of the camera pitch. The electronic device 102 may determine 406 which of the detected features are below this horizon.

The electronic device 102 may perform 408 an inverse projection of features that lie below a horizon using a relative transform between the optical axis of the camera 228 and the road plane. The relative transform may be based on the precalibration data. For example, the electronic device 102 may inverse project the features back onto the road coordinate system. In other words, if a feature is below the horizon, the electronic device 102 may inverse project that feature back onto a 3D location, given that the point may lie on the road plane.

The inverse projection may use the height, pitch and roll of the camera 228 to transform between the camera plane and the road plane. The camera height relative to ground may be determined from precalibration data. In an implementation, the electronic device 102 may use Equations 1-5 to determine the 3D location of a feature in the road coordinate system. The 3D location of a feature may include an x-coordinate (i.e., a lateral component), a y-coordinate (i.e., a vertical component) and a z-coordinate (i.e., a depth component).

The electronic device 102 may classify 410 a feature as a road feature if the feature is within a predefined range 122 in the road plane. In an implementation, the predefined range 122 may include an x-coordinate range [−xRange, xRange] and a z-coordinate range [0, zRange] within the road coordinate system. If the calculated x-coordinate is within [−xRange, xRange] and the calculated z-coordinate is within [0, zRange], then the feature may be classified 410 as a road feature.

The electronic device 102 may initialize 412 the road feature with the depth (z) determined from the inverse projection. For features that are classified as road features, the electronic device 102 may discard a depth estimation based on Gauss-Newton (GN)-based depth estimation methods. The electronic device 102 may use the depth (z) determined from the inverse projection to update a visual inertial odometry (VIO) extended Kalman filter (EKF).

The electronic device 102 may set 414 an image patch for the road feature normal to the road plane. The road plane is determined during the inverse projection based on the calibrated pitch, roll and height of the camera 228. To facilitate tracking of the road features, the electronic device 102 may align the image patch normal of the road features to the road plane normal.

Figure 5:
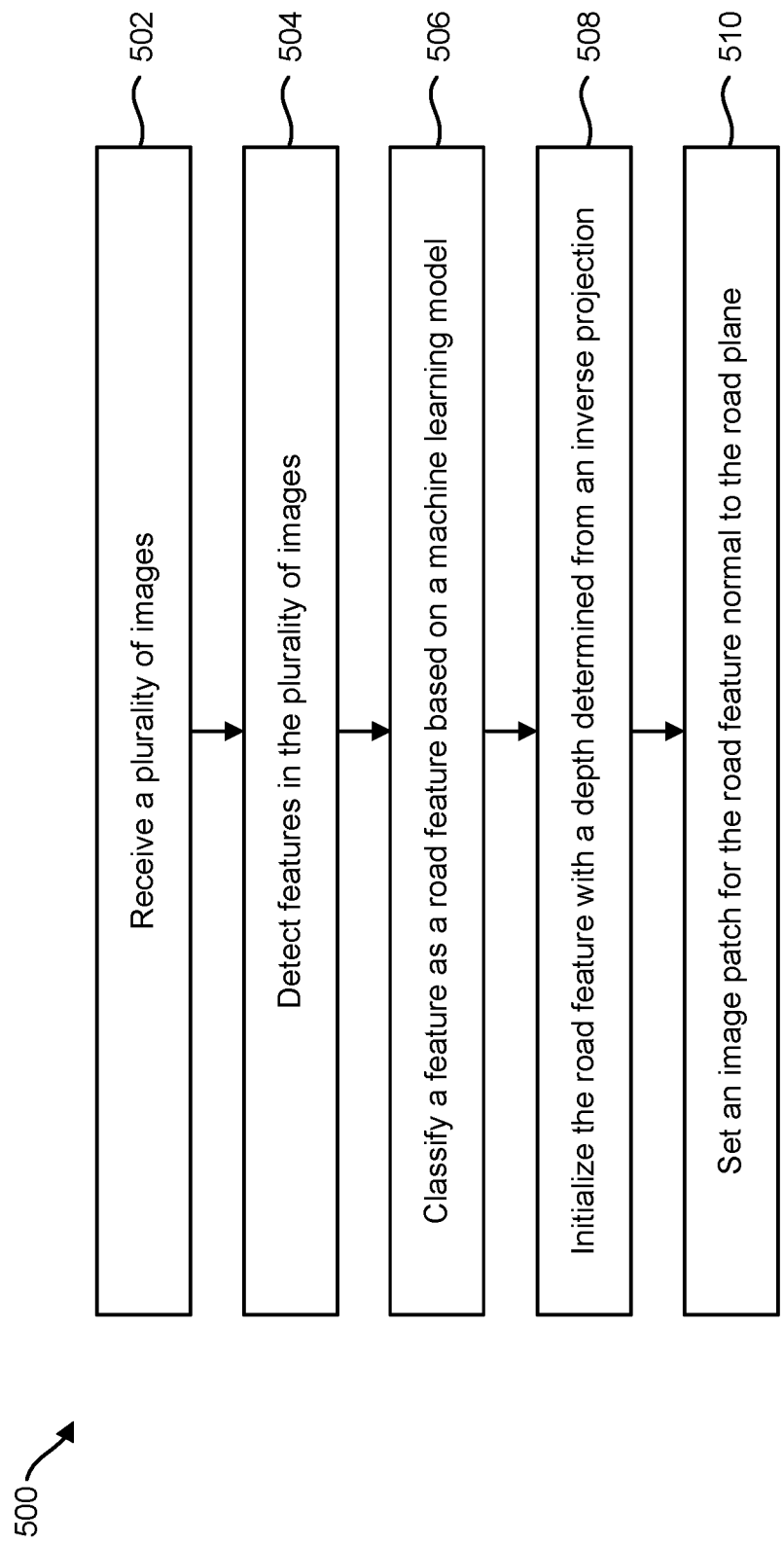
FIG. 5 is a flow diagram illustrating one configuration of a method for classifying road features based on a machine learning model.

FIG. 5 is a flow diagram illustrating one configuration of a method 500 for classifying road features based on a machine learning model. The method 500 may be performed by one or more of the electronic devices 102 described herein.

The electronic device 102 may receive 502 a plurality of images. For example, the electronic device 102 may be configured with a camera 228. The camera 228 may capture one or more images (e.g., digital images, image frames, video, etc.).

The electronic device 102 may detect 504 features in the plurality of images. This may be accomplished as described in connection with FIG. 4.

The electronic device 102 may classify 506 a feature as a road feature based on a machine learning model. In an implementation, the electronic device 102 may be preconfigured with a machine learning model that categorizes features as road features or not road features based on the intensity information and location information of the feature in an image. The electronic device 102 may apply intensity information and location information of the detected features to the machine learning model. The machine learning model may classify the features as road features or not road features.

The electronic device 102 may initialize 508 the road feature with the depth (z) determined from an inverse projection. For each feature that was classified as a road feature, the electronic device 102 may perform an inverse projection using a relative transform between a camera plane and a road plane. This may be accomplished as described in connection with FIG. 4. The electronic device 102 may determine a 3D location (e.g., an x-coordinate, y-coordinate, and z-coordinate) of the road feature in the road coordinate system. The electronic device 102 may discard a depth estimation based on Gauss-Newton (GN)-based depth estimation methods. The electronic device 102 may use the depth (z) determined from the inverse projection to update a visual inertial odometry (VIO) extended Kalman filter (EKF).

The electronic device 102 may set 510 an image patch for the road feature normal to the road plane. This may be accomplished as described in connection with FIG. 4.

Figure 6:
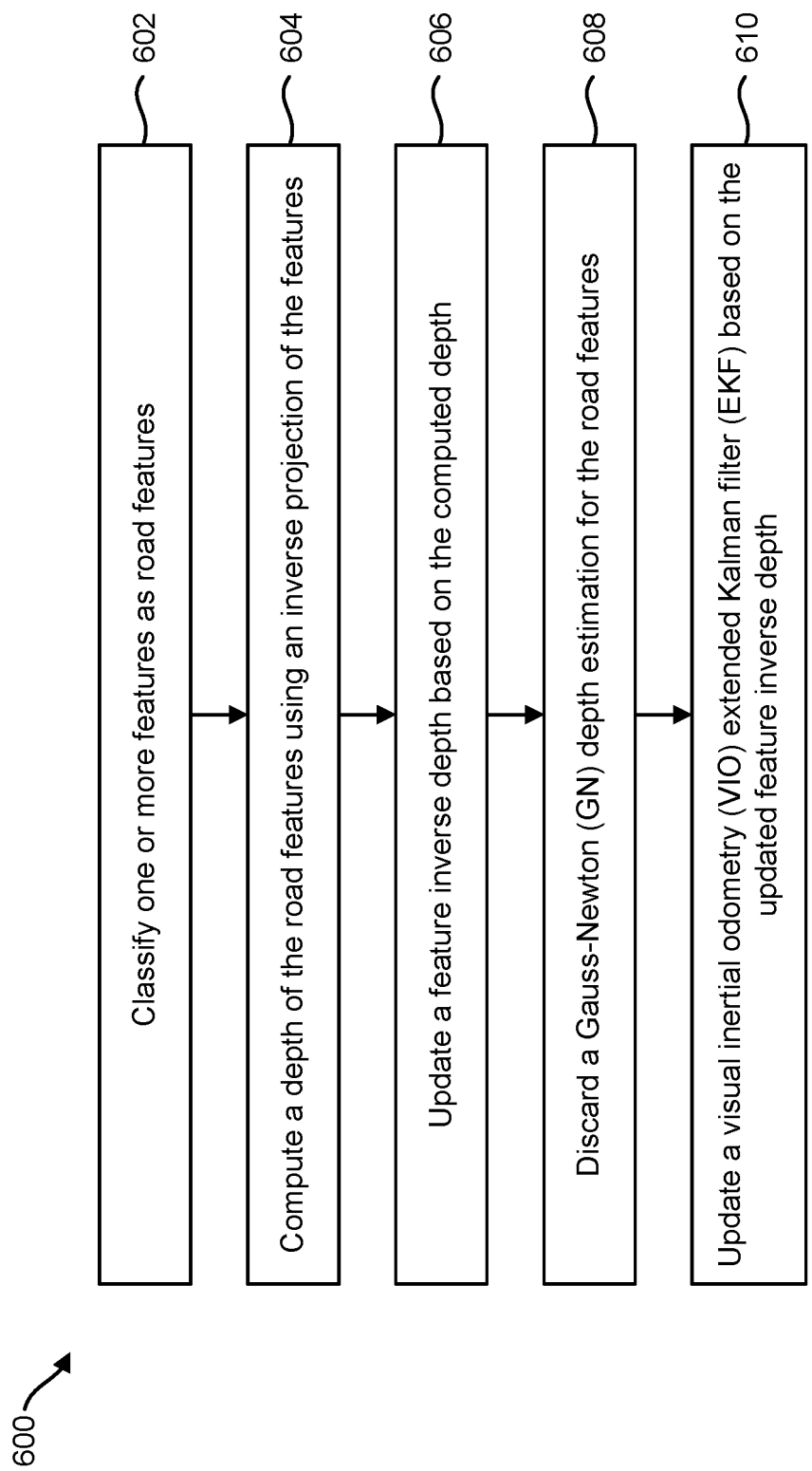
FIG. 6 is a flow diagram illustrating one configuration of a method for updating a visual inertial odometry (VIO) extended Kalman filter (EKF)

FIG. 6 is a flow diagram illustrating one configuration of a method 600 for updating a visual inertial odometry (VIO) extended Kalman filter (EKF). The method 600 may be performed by one or more of the electronic devices 102 described herein.

The electronic device 102 may classify 602 one or more features as road features. This may be accomplished as described in connection with FIG. 4 or FIG. 5.

The electronic device 102 may compute 604 a depth (z) of the road features using an inverse projection of the features. For each feature that was classified as a road feature, the electronic device 102 may perform an inverse projection using a relative transform between a camera plane and a road plane. This may be accomplished as described in connection with FIG. 4.

The electronic device 102 may update 606 a feature inverse depth based on the computed depth (z). For example, the electronic device 102 may initially estimate the depth of the feature using Gauss-Newton (GN)-based depth estimation methods. The electronic device 102 may discard 608 the GN-based depth estimation. For each feature classified as a road feature, the electronic device 102 may use the computed depth (z) obtained from the inverse projection.

The electronic device 102 may update 610 a visual inertial odometry (VIO) extended Kalman filter (EKF) based on the updated feature inverse depth. In a batch update, for every detected feature, the electronic device 102 may use the information from each feature to refine the pose and the trajectory of the camera 228 or the vehicle. The road features may be initialized with the inverse depth (i.e., z coordinate) determined from the inverse projection. In an implementation, the electronic device 102 may also update the VIO EKF based on an uncertainty of road model depth standard deviation.

Figure 7:
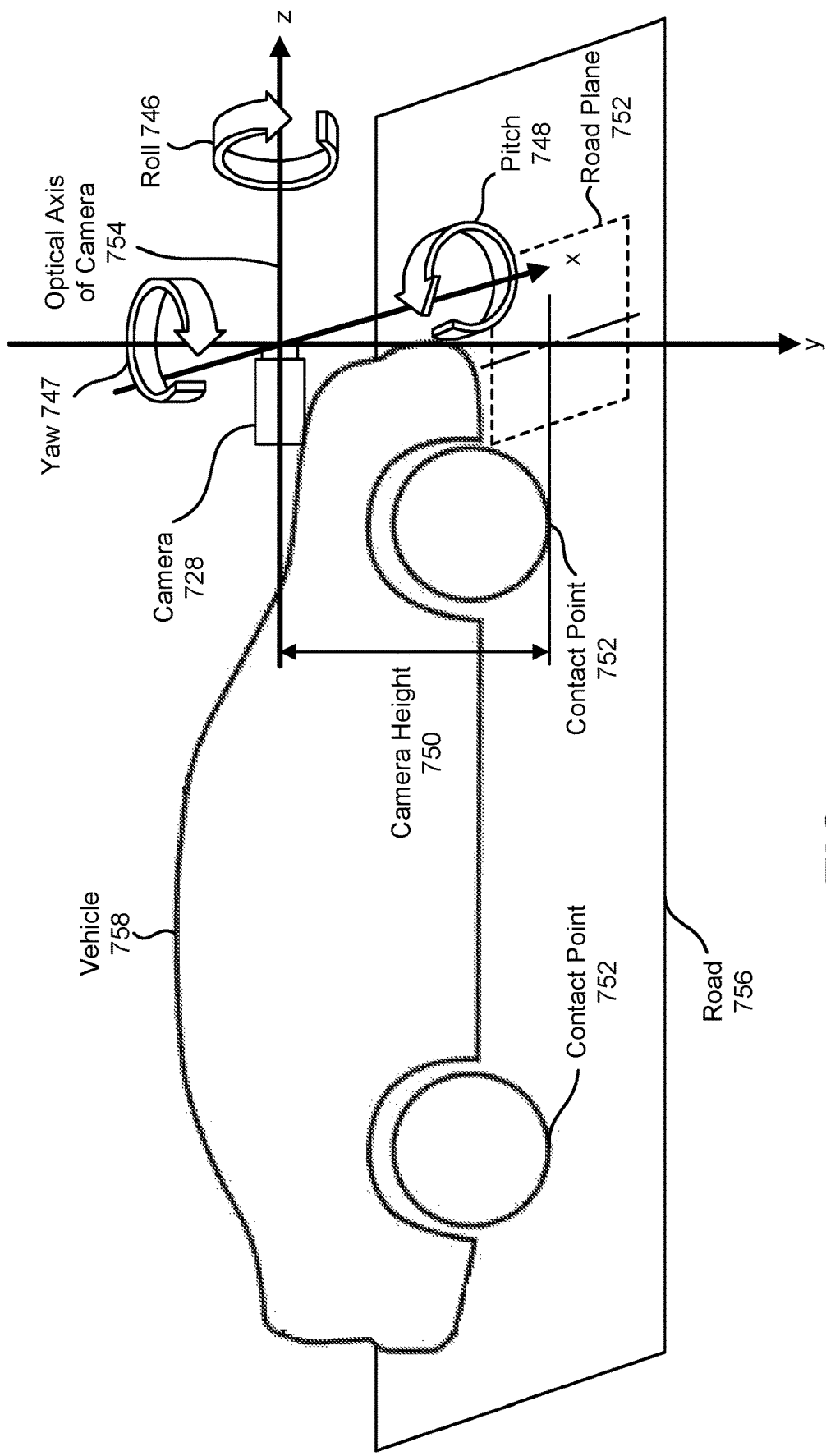
FIG. 7 illustrates various aspects of road geometry that may be used for classifying road features as described herein.

FIG. 7 illustrates various aspects of road geometry that may be used for classifying road features as described herein. A vehicle 758 (e.g., an automobile, truck, bus, etc.) may be configured with a camera 728. In FIG. 7, the camera 728 is mounted (e.g., attached) to the front of the vehicle 758 with the lens of the camera 728 facing forward. In other words, the camera 728 may be mounted on the vehicle 758 such that the optical axis 754 of the camera 728 is oriented approximately in the direction of forward motion during operation the vehicle 758.

It should be noted that although FIG. 7 depicts the camera 728 as being located on a front region (e.g., hood) of the vehicle 758, the camera 728 may be mounted in other locations on the vehicle 758. For example, the camera 728 may be mounted on the roof or on the bumper of the vehicle 758. Furthermore, the camera 728 may be mounted within the interior of the vehicle 758 (e.g., on the dashboard facing out of the windshield).

The pitch 748, roll 746 and yaw 747 of the camera 728 may be defined with respect to the optical axis 754 of the camera 728. The three-dimensional coordinate system of the camera 728 may be defined by an x-axis (left/right), a y-axis (up/down) and a z-axis (forward/backward). In this example, the optical axis 754 of the camera 728 is oriented along the z-axis. The three-dimensional coordinate system of the camera 728 may originate at the lens of the camera 728.

In this example, the roll 746 may be defined as the angle of the camera 728 with respect to the z-axis. The pitch 748 may be defined as the angle of the camera 728 with respect to the x-axis. Therefore, the roll 746 may be the angle of the camera 728 about the optical axis 754 (e.g., z-axis) and the pitch 748 may be the angle of the camera 728 about a first dimension (e.g., x-axis) that is orthogonal to the optical axis 754 of the camera 728.

The yaw 747 may be defined as the angle of the camera 728 with respect to the y-axis. In other words, the yaw 747 may be the angle of the camera 728 about a second dimension (e.g., y-axis) that is orthogonal to the optical axis 754 of the camera 728 and orthogonal to the first dimension (e.g., x-axis).

The camera height 750 may be defined as the perpendicular distance between the optical axis 754 of the camera 728 and a road plane 752. The road plane 752 may be defined as the surface the vehicle 758 is configured to contact during operation. For example, a contact point 760 where a tire of the vehicle 758 engages the road 756 may be a point on the road plane 752. In an implementation, the road plane 752 may be modeled as a flat plane. However, the road plane 752 may be modeled as other shapes (e.g., curved).

In an implementation, the road plane 752 may be defined in relation to the camera coordinate system. For example, the road plane 752 may lie in the z-axis and x-axis of the camera coordinate system. However, the road plane 752 may be offset from the camera coordinate system by the camera height 750. Feature points within the camera coordinate system may be translated to the road plane 752 via an inverse projection, as described in connection with Equations 1-5.

In an implementation, the camera height 750 may be preconfigured. In another implementation, the camera height 750 may be calibrated using target markers with known heights from the road plane 752.

It should be noted that in some cases, the contact points 760 for wheels on a supporting surface of the vehicle 758 may be a different distance than the camera height 750 above the road plane 752 since road consistency can vary. For example, a pot hole may be under the camera 728 but the wheels are contacting at a higher point on the road 756.

Figure 8:
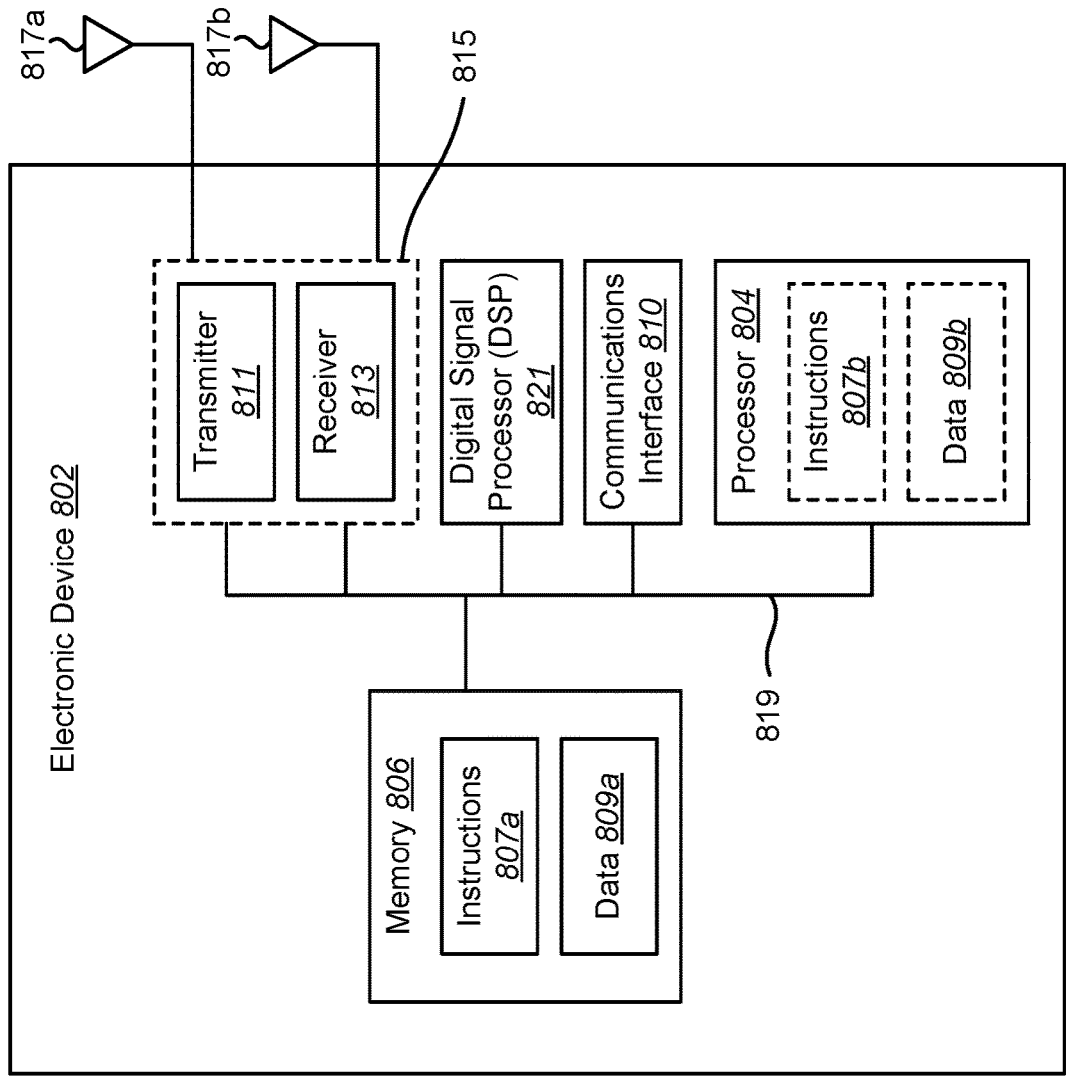
FIG. 8 illustrates certain components that may be included within an electronic device configured to implement various configurations of the systems and methods disclosed herein.

FIG. 8 illustrates certain components that may be included within an electronic device 802 configured to implement various configurations of the systems and methods disclosed herein. Examples of the electronic device 802 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart applications, healthcare equipment, gaming consoles, personal digital assistants (PDAs), set-top boxes, etc. The electronic device 802 may be implemented in accordance with one or more of the electronic devices 102 described herein.

The electronic device 802 includes a processor 804. The processor 804 may be a general-purpose single- or multi-chip microprocessor (e.g., an ARM), a special-purpose microprocessor (e.g., a digital signal processor (DSP)), a microcontroller, a programmable gate array, etc. The processor 804 may be referred to as a central processing unit (CPU). Although just a single processor 804 is shown in the electronic device 802, in an alternative configuration, a combination of processors (e.g., an ARM and DSP) could be implemented.

The electronic device 802 also includes memory 806. The memory 806 may be any electronic component capable of storing electronic information. The memory 806 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 809*a* and instructions 807*a* may be stored in the memory 806. The instructions 807*a* may be executable by the processor 804 to implement one or more of the methods, procedures, steps, and/or functions described herein. Executing the instructions 807*a* may involve the use of the data 809*a* that is stored in the memory 806. When the processor 804 executes the instructions 807, various portions of the instructions 807*b* may be loaded onto the processor 804 and/or various pieces of data 809*b* may be loaded onto the processor 804.

The electronic device 802 may also include a transmitter 811 and/or a receiver 813 to allow transmission and reception of signals to and from the electronic device 802. The transmitter 811 and receiver 813 may be collectively referred to as a transceiver 815. One or more antennas 817*a-b* may be electrically coupled to the transceiver 815. The electronic device 802 may also include (not shown) multiple transmitters, multiple receivers, multiple transceivers and/or additional antennas.

The electronic device 802 may include a digital signal processor (DSP) 821. The electronic device 802 may also include a communications interface 810. The communications interface 810 may allow and/or enable one or more kinds of input and/or output. For example, the communications interface 810 may include one or more ports and/or communication devices for linking other devices to the electronic device 802. In some configurations, the communications interface 810 may include the transmitter 811, the receiver 813, or both (e.g., the transceiver 815). Additionally or alternatively, the communications interface 810 may include one or more other interfaces (e.g., touchscreen, keypad, keyboard, microphone, camera, etc.). For example, the communication interface 810 may enable a user to interact with the electronic device 802.

The various components of the electronic device 802 may be coupled together by one or more buses, which may include a power bus, a control signal bus, a status signal bus, a data bus, etc. For the sake of clarity, the various buses are illustrated in FIG. 8 as a bus system 819.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device, comprising:
    a memory storing precalibration data for a camera mounted on a vehicle, the precalibration data including a camera height determined relative to a road plane the vehicle is configured to contact during operation; and
    a processor in communication with the memory, the processor configured to:
        receive a plurality of images captured by the camera;
        receive inertial measurement data from an inertial measurement unit, wherein the inertial measurement data includes data from a three-axis accelerometer and data from a three-axis gyroscopic sensor;
        classify one or more features in the plurality of images as road features based on the precalibration data; and
        determine a camera pose by combining a first contribution with a second contribution in a visual inertial odometry (VIO) system, the first contribution being based on the classified one or more features in the plurality of images captured by the camera, and the second contribution being based on the inertial measurement data, wherein the VIO system combines a depth determined from the classified one or more features with the inertial measurement data.

2. The electronic device of claim 1, wherein the camera height includes a perpendicular distance between an optical axis of the camera and the road plane.

3. The electronic device of claim 2, wherein the precalibration data further includes a pitch of the camera about a first dimension that is orthogonal to the optical axis of the camera.

4. The electronic device of claim 3, wherein the precalibration data further includes a roll of the camera about the optical axis of the camera.

5. The electronic device of claim 1, wherein classifying the one or more features in the plurality of images as road features comprises:
    determining features that lie below a horizon based on a pitch of the camera;
    performing an inverse projection of the features that lie below the horizon using a relative transform between an optical axis of the camera and the road plane based on the precalibration data; and classifying a feature as a road feature if the feature is located within a predefined range in the road plane.

6. The electronic device of claim 5, wherein the predefined range comprises a lateral range and a depth range with respect to the road plane.

7. The electronic device of claim 6, wherein the depth range is oriented along the optical axis of the camera as transformed to the road plane and the lateral range is oriented along a first dimension that is orthogonal to the optical axis of the camera as transformed to the road plane.

8. The electronic device of claim 5, wherein classifying the one or more features in the plurality of images as road features further comprises aligning an image patch normal to a road plane normal.

9. The electronic device of claim 1, wherein classifying the one or more features in the plurality of images as road features comprises:
applying intensity information and location information of a feature to a machine learning model.

10. The electronic device of claim 1, wherein the processor is further configured to:
compute a depth of the road features using an inverse projection of the features;
update a feature inverse depth based on the computed depth; and
update a visual inertial odometry (VIO) extended Kalman filter (EKF) based on the updated feature inverse depth.

11. The electronic device of claim 10, wherein the processor is further configured to update the VIO EKF based on an uncertainty of road model depth standard deviation.

12. A method, comprising:
storing precalibration data for a camera mounted on a vehicle, the precalibration data including a camera height determined relative to a road plane the vehicle is configured to contact during operation;
receiving a plurality of images captured by the camera;
receiving inertial measurement data from an inertial measurement unit, wherein the inertial measurement data includes data from a three-axis accelerometer and data from a three-axis gyroscopic sensor;
classifying one or more features in the plurality of images as road features based on the precalibration data; and
determining a camera pose by combining a first contribution with a second contribution in a visual inertial odometry (VIO) system, the first contribution being based on the classified one or more features in the plurality of images captured by the camera, and the second contribution being based on the inertial measurement data, wherein the VIO system combines a depth determined from the classified one or more features with the inertial measurement data.

13. The method of claim 12, wherein the camera height includes a perpendicular distance between an optical axis of the camera and the road plane.

14. The method of claim 13, wherein the precalibration data further includes a pitch of the camera about a first dimension that is orthogonal to the optical axis of the camera.

15. The method of claim 12, wherein classifying the one or more features in the plurality of images as road features comprises:
determining features that lie below a horizon based on a pitch of the camera;
performing an inverse projection of the features that lie below the horizon using a relative transform between an optical axis of the camera and the road plane based on the precalibration data; and
classifying a feature as a road feature if the feature is located within a predefined range in the road plane.

16. The method of claim 15, wherein the predefined range comprises a lateral range and a depth range with respect to the road plane.

17. The method of claim 12, wherein classifying the one or more features in the plurality of images as road features comprises:
applying intensity information and location information of a feature to a machine learning model.

18. The method of claim 12, further comprising:
computing a depth of the road features using an inverse projection of the features;
updating a feature inverse depth based on the computed depth; and
updating a visual inertial odometry (VIO) extended Kalman filter (EKF) based on the updated feature inverse depth.

19. A non-transitory computer readable medium storing computer executable code, comprising:
code for causing an electronic device to store precalibration data for a camera mounted on a vehicle, the precalibration data including a camera height determined relative to a road plane the vehicle is configured to contact during operation;
code for causing the electronic device to receive a plurality of images captured by the camera;
code for causing the electronic device to receive inertial measurement data from an inertial measurement unit, wherein the inertial measurement data includes data from a three-axis accelerometer and data from a three-axis gyroscopic sensor;
code for causing the electronic device to classify one or more features in the plurality of images as road features based on the precalibration data; and
code for causing the electronic device to determine a camera pose by combining a first contribution with a second contribution in a visual inertial odometry (VIO) system, the first contribution being based on the classified one or more features in the plurality of images captured by the camera, and the second contribution being based on the inertial measurement data, wherein the VIO system combines a depth determined from the classified one or more features with the inertial measurement data.

20. The computer readable medium of claim 19, wherein the camera height includes a perpendicular distance between an optical axis of the camera and the road plane.

21. The computer readable medium of claim 19, wherein the code for causing the electronic device to classify the one or more features in the plurality of images as road features comprises:
code for causing the electronic device to determine features that lie below a horizon based on a pitch of the camera;
code for causing the electronic device to perform an inverse projection of the features that lie below the horizon using a relative transform between an optical axis of the camera and the road plane based on the precalibration data; and
code for causing the electronic device to classify a feature as a road feature if the feature is located within a predefined range in the road plane.

22. The computer readable medium of claim 21, wherein the predefined range comprises a lateral range and a depth range with respect to the road plane.

23. The computer readable medium of claim 19, wherein code for causing the electronic device to classify the one or more features in the plurality of images as road features comprises:
    code for causing the electronic device to apply intensity information and location information of a feature to a machine learning model.

24. The computer readable medium of claim 19, further comprising:
    code for causing the electronic device to compute a depth of the road features using an inverse projection of the features;
    code for causing the electronic device to update a feature inverse depth based on the computed depth; and
    code for causing the electronic device to update a visual inertial odometry (VIO) extended Kalman filter (EKF) based on the updated feature inverse depth.

25. An apparatus, comprising:
    means for storing precalibration data for a camera mounted on a vehicle, the precalibration data including a camera height determined relative to a road plane the vehicle is configured to contact during operation;
    means for receiving a plurality of images captured by the camera;
    means for receiving inertial measurement data from an inertial measurement unit, wherein the inertial measurement data includes data from a three-axis accelerometer and data from a three-axis gyroscopic sensor;
    means for classifying one or more features in the plurality of images as road features based on the precalibration data; and
    means for determining a camera pose by combining a first contribution with a second contribution in a visual inertial odometry (VIO) system, the first contribution being based on the classified one or more features in the plurality of images captured by the camera, and the second contribution being based on the inertial measurement data, wherein the VIO system combines a depth determined from the classified one or more features with the inertial measurement data.

26. The apparatus of claim 25, wherein the means for classifying the one or more features in the plurality of images as road features comprise:
    means for determining features that lie below a horizon based on a pitch of the camera;
    means for performing an inverse projection of the features that lie below the horizon using a relative transform between an optical axis of the camera and the road plane based on the precalibration data; and
    means for classifying a feature as a road feature if the feature is located within a predefined range in the road plane.

27. The apparatus of claim 26, wherein the predefined range comprises a lateral range and a depth range with respect to the road plane.

28. The apparatus of claim 25, wherein the means for classifying the one or more features in the plurality of images as road features comprises:
    means for applying intensity information and location information of a feature to a machine learning model.

29. The apparatus of claim 25, further comprising:
    means for computing a depth of the road features using an inverse projection of the features;
    means for updating a feature inverse depth based on the computed depth; and
    means for updating a visual inertial odometry (VIO) extended Kalman filter (EKF) based on the updated feature inverse depth.

\* \* \* \* \*